Sept. 11, 1962

G. CHEVREUX 3,053,234

HYDRAULIC LIFT SYSTEMS

Filed March 31, 1958

INVENTOR.
GERARD CHEVREUX
BY

ATTORNEY

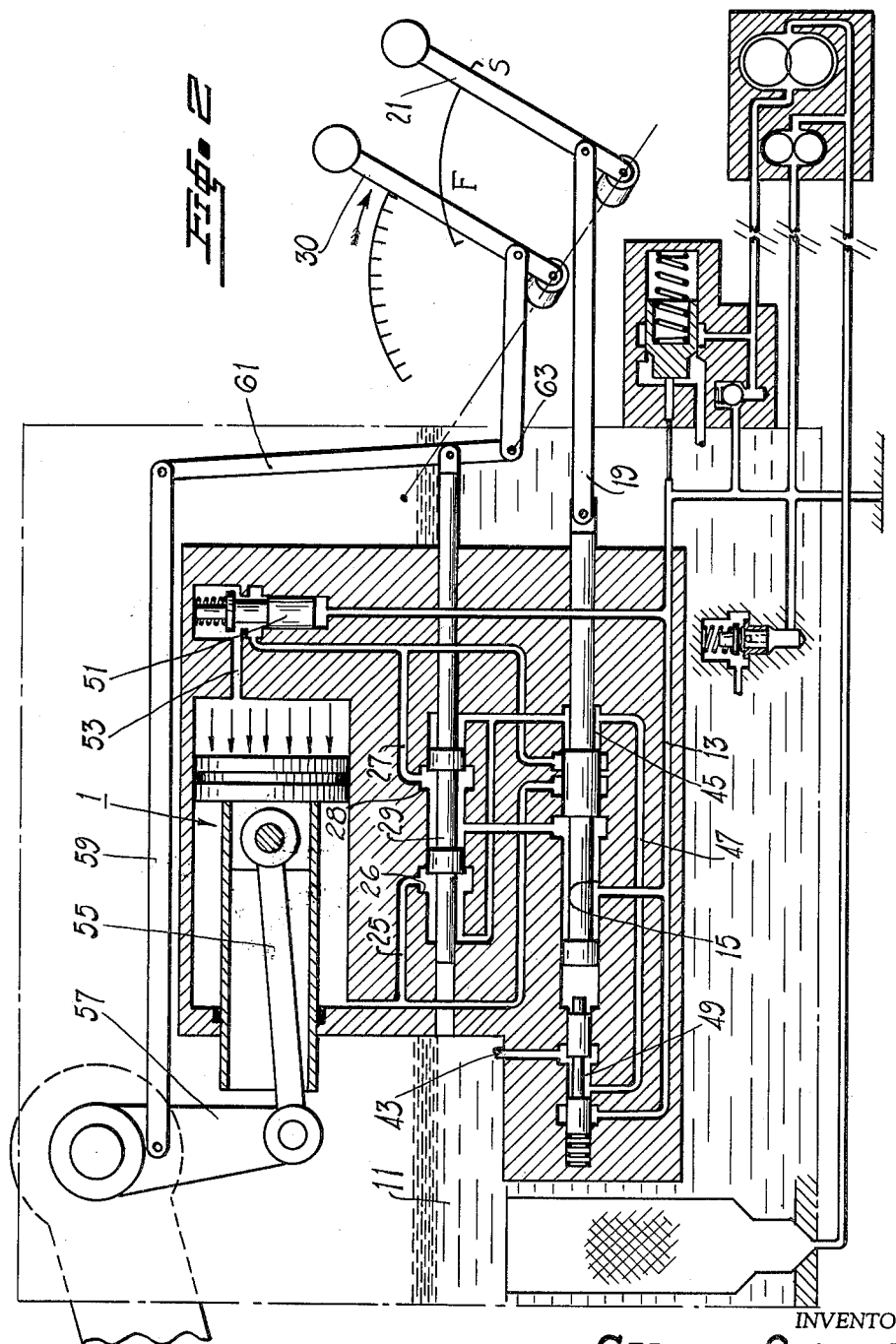

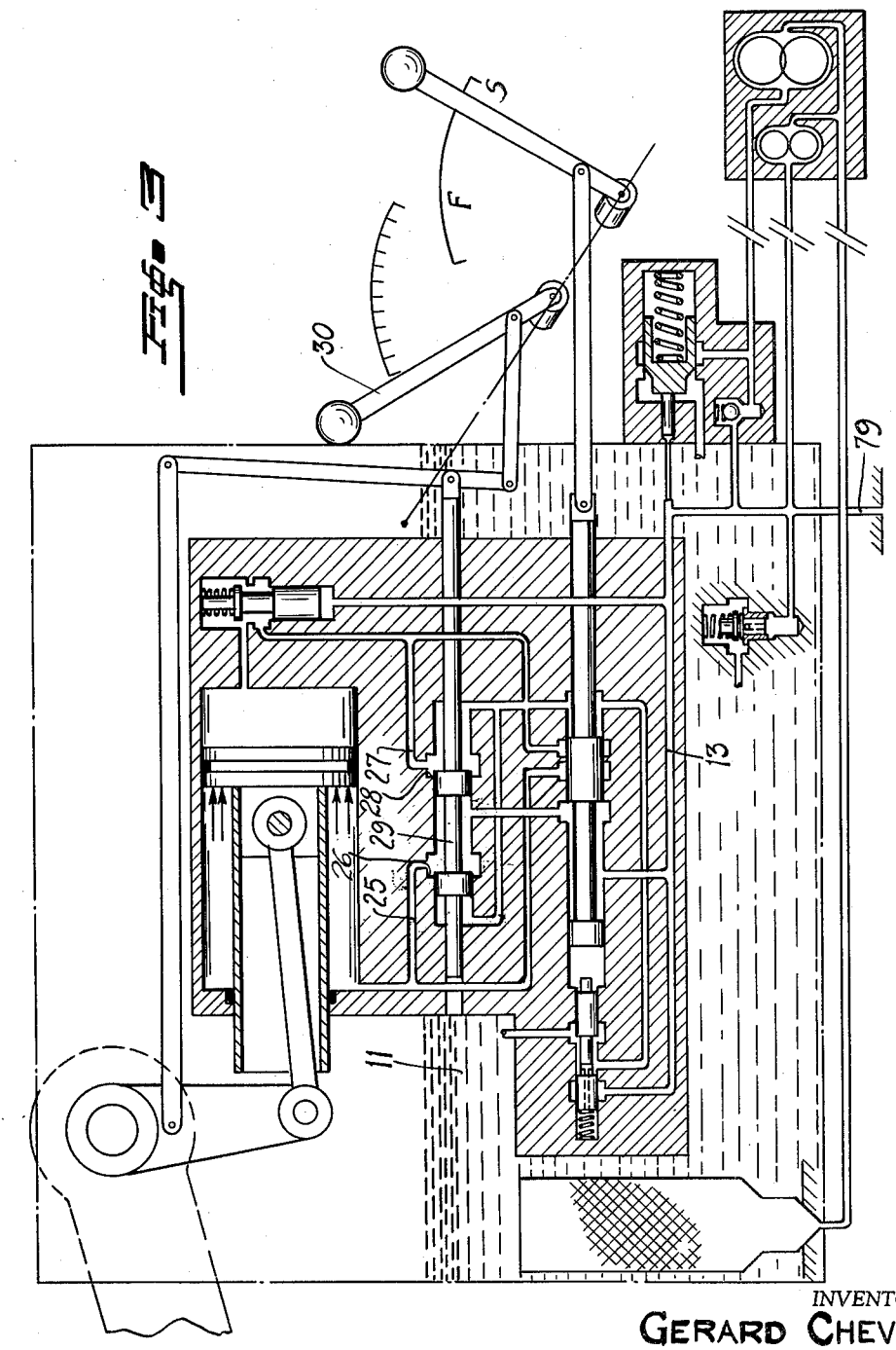

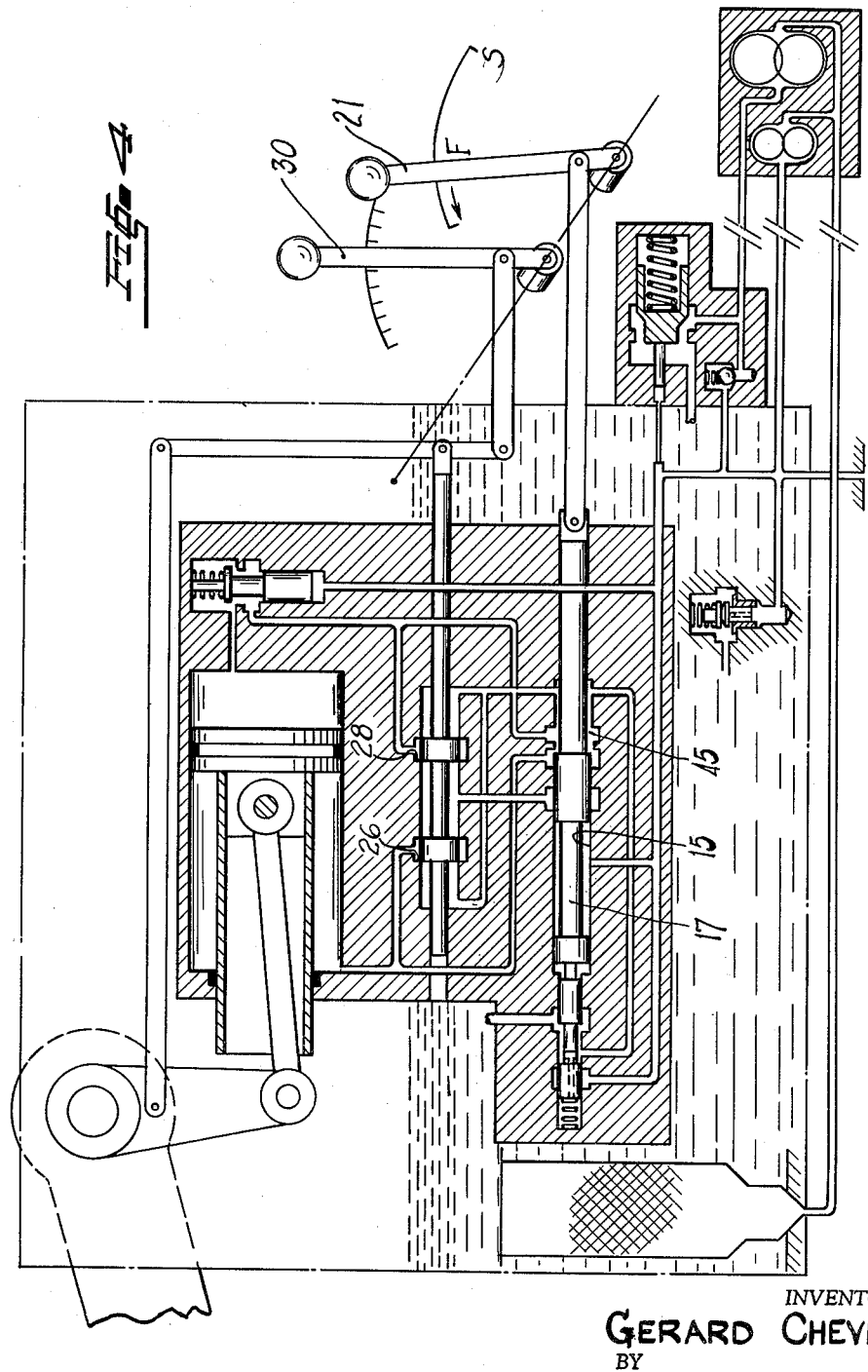

Sept. 11, 1962 G. CHEVREUX 3,053,234
HYDRAULIC LIFT SYSTEMS
Filed March 31, 1958 5 Sheets-Sheet 5
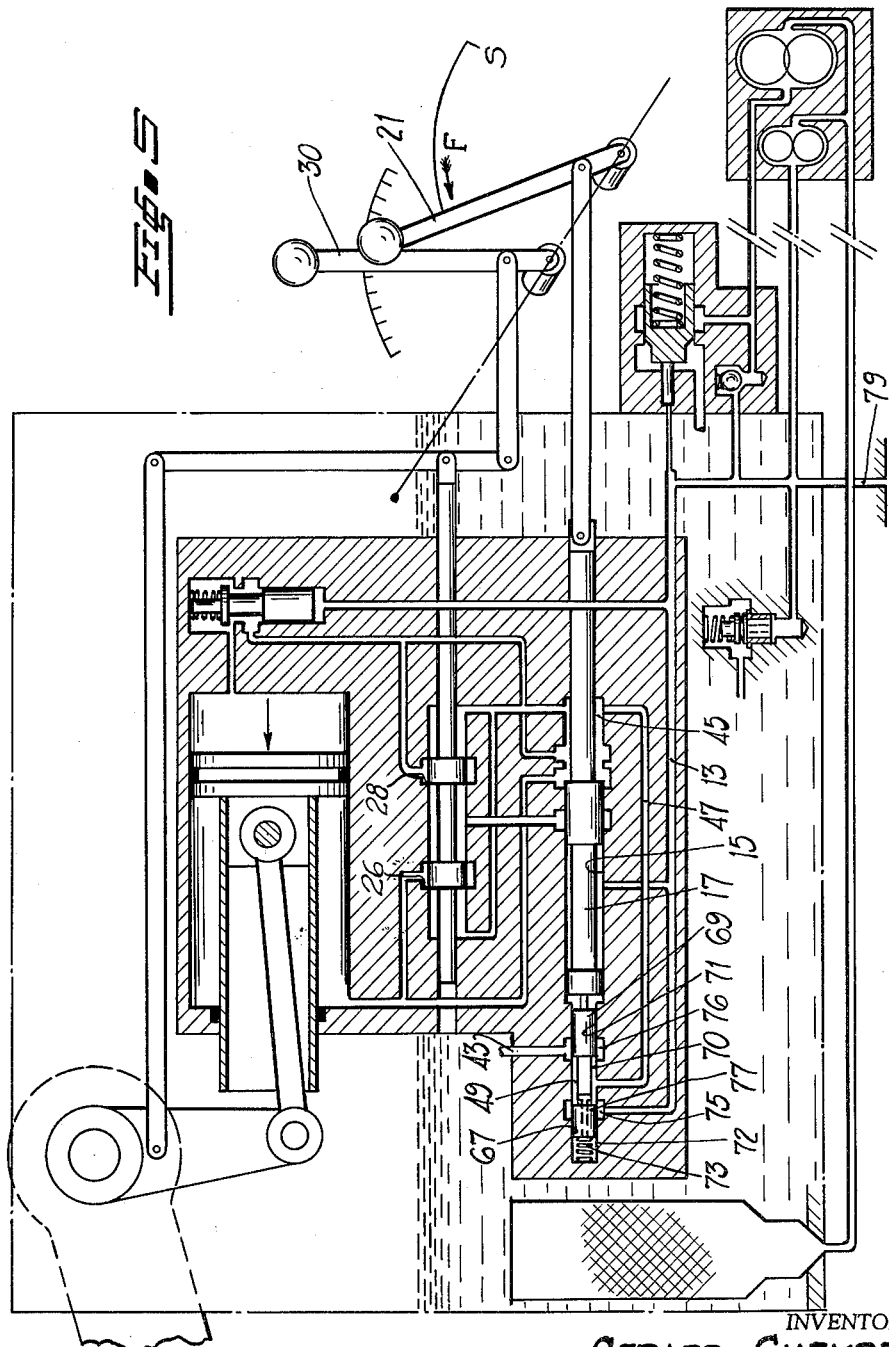
INVENTOR.
GERARD CHEVREUX
BY
ATTORNEY

United States Patent Office 3,053,234
Patented Sept. 11, 1962

3,053,234
HYDRAULIC LIFT SYSTEMS
Gerard Chevreux, Colombes, France, assignor to The Bendix Corporation, a corporation of Delaware
Filed Mar. 31, 1958, Ser. No. 724,986
10 Claims. (Cl. 121—41)

The invention relates to hydraulic lift systems and more particularly to improvements in hydraulic lifts of the type used for controlling "mounted" agricultural implements drawn by a tractor.

The practice has now prevailed to provide on tractors of the above type whose rear wheels only are tractive, a separate device adapted to momentarily transfer a part of the weight of the implement (which normally rests on the ground) onto the rear axle for increasing the maximum effort the tractor can deliver and counteracting slip of the rear wheels. The load increase on the rear axle should preferably be under manual control and, as it imposes abnormal work conditions, it should be designed so that the driver cannot leave the control lever of the anti-slip device in its operating position.

It is an object of the invention to improve upon the anti-slip devices now in use by providing a device which is simple in structure, reliable in operation, and is limited in its effect so that operation of the anti-slip cannot lift the front wheels of the tractor off the ground.

It is another object of the invention to provide a hydraulic lift including an anti-slip device actuated independently from the lift cylinder and enabling the driver to "feel" the proportion of implement weight which is transferred to the rear axle, owing to the reaction rate transmitted by the control valve of that device.

It is still another object of the invention to provide a hydraulic lift including a control mechanism which brings back the parts of the lift power cylinder toward floating position (normal working position) as soon as the driver releases the actuating force on the control lever of the anti-slip device.

It is a further object of the invention to provide an improved control mechanism for lifts of the type having a depth control system operated by a first control handle which automatically maintains the ground working implements at depth settings corresponding to the position of said first control handle, said improved control mechanism including a second control handle which when in one end position causes said automatic depth control system to be operative, when in an intermediate position disables the automatic depth control system, and when in the opposite end position performs an anti-skid function.

Other objects and advantages of the invention will appear on reading the following description, which refers to a specific embodiment given as an example only; the general structure of the hydraulic system has been described in French Patent No. 1,144,157 to Société Anonyme Bendix, and reference is made thereto for further details. The description refers to the accompanying drawings, which form a part of a specification and in which:

FIGURE 2 is a view similar to FIGURE 1, the valve member of the control valve being shown in the "raising" position.

FIGURE 3 is a view similar to FIGURE 1, the valve member of the control valve being represented in the "lowering" position.

Figure 1:
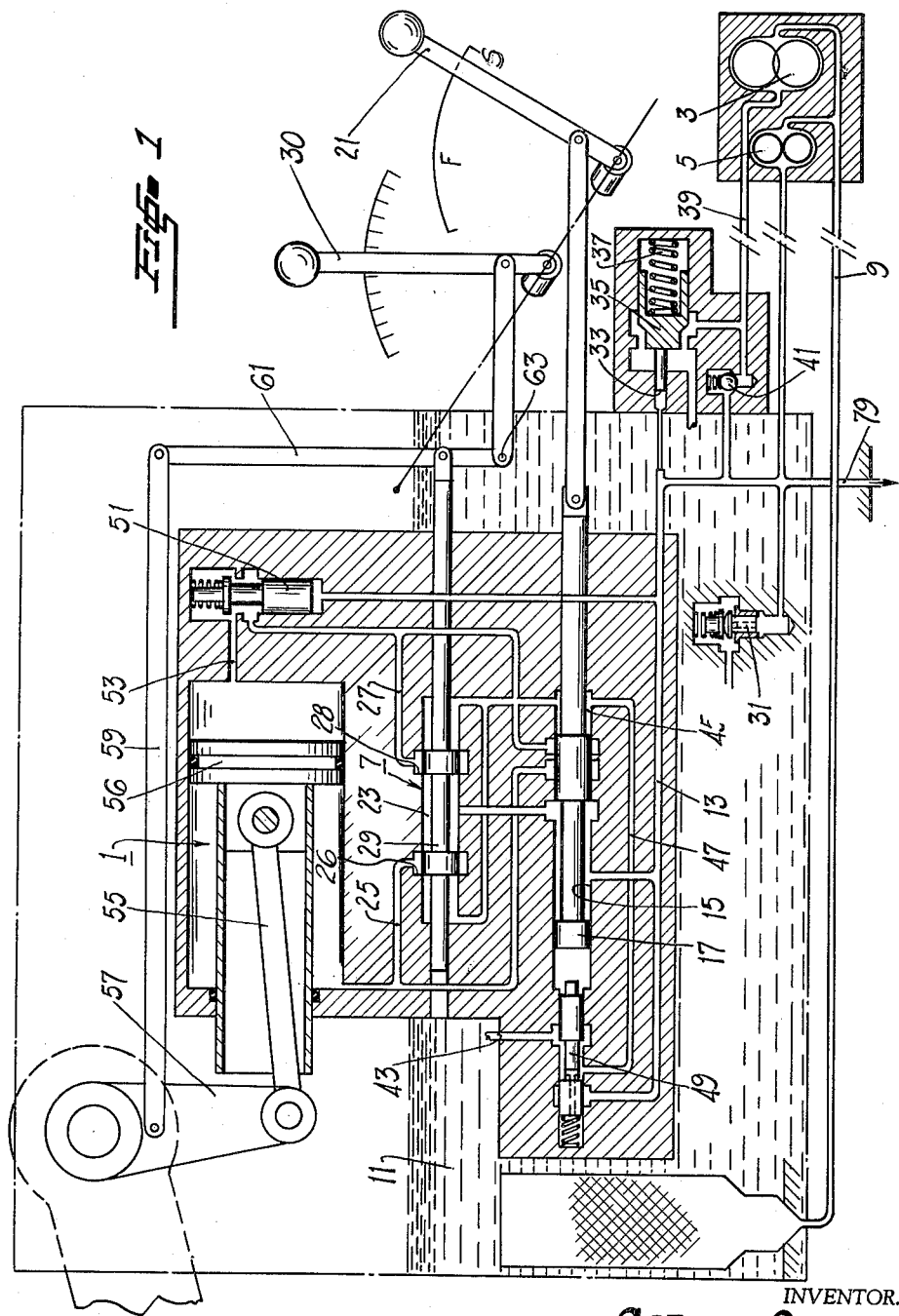
FIGURE 1 represents a hydraulic lift of the servo-type provided with the anti-slip device according to the invention, the valve member of the control valve and the lift jack being represented in rest position (also referred to as normal or neutral position).

FIGURE 4 is a view similar to FIGURE 1, in which the valve spool which controls the "servo" or "floating" operation of the system is placed by an auxiliary linkage in "floating" position, the valve member of the control valve being represented in its neutral position, although it can then occupy any position; and FIGURE 5 is a view similar to FIGURE 1, in which the valve spool is shifted beyond its "servo" position for operating the anti-slip control valve, the valve member being still represented in neutral position, though it could have then any position.

The hydraulic lift system, as shown for instance on FIGURE 1, comprises a power cylinder 1 which can be fed from a double pump 3, 5, through pipes in which the flow is regulated by a servo control valve 7. In a more detailed manner, the hydraulic circuit comprises a double pump having a power pump 3 able to deliver a high rate of flow and a pressure pump 5 adapted to deliver a much lower flow under a high pressure. These two pumps are connected to a common inlet conduit 9 which communicates with a reservoir 11. The pressure pump 5 delievers hydraulic fluid into a pipe 13 which opens into the bore 15 of the "floating" valve reciprocably locating a "floating" valve spool 17.

As long as the control linkage 19 of the "floating" valve spool is in the "servo" position (corresponding to the position S of a control lever 21), the conduit 13 remains in communication, through the intermediary of the bore 15, with a central chamber 23 of the control valve 7 of the power cylinder. This control valve can be either of the closed-center type (such as shown on the figures), or of the open-center type. In the case of a closed-center valve, when the piston 29 of the control valve 7 is in its neutral position (as shown on FIGURE 1), communication of the central chamber 23 with one or the other of the power lines 25 and 27 having working ports 26 and 28 leading to the opposed compartments of the power cylinder is cut off.

As long as the piston 29 of the control valve remains in its neutral position, the flow delivered by the pressure pump 5 to the exhaust valve 31 connected to the reservoir 11 is sufficient to maintain in the pipe 13 a pressure slightly higher than the normal working pressure of the power cylinder. The pressure discharge of the pressure pump 5 is exerted on an end piston surface 33 of the valve head 35 to overcome the force of coil spring 37 and thereby cause the pipe 39 to be discharged and the power pump 3 to be unloaded.

The pressure pump 5 can only provide a small rate of flow, insufficient to feed by itself the power cylinder 1, when the latter is used. The large flow of fluid required to rapidly actuate the power cylinder 1 is provided by the power pump 3. As soon as the power cylinder 1 is communicated with the pipe 13 by the piston 29 of the control valve, the pressure in the circuit lowers slightly but by an amount sufficient to allow the spring 37 to seat the valve head 35, thus closing off communication between the outlet line 39 and the reservoir. The pressure rises in the outlet line 39 and lifts a valve ball 41 to allow the power pump to deliver flow into the pipe 13.

As long as the control linkage 19 remains in the "servo" position (as shown on FIGURES 1 to 3) the operation of this device occurs in the manner described in French patent referred to above. In short, the operation is as follows: When the valve member 29 is manually shifted towards the right from its normal position in order to raise the implement (FIGURE 2) the valve member 29 uncovers the openings of the power lines 25 and 27. Power line 27 is connected to pressure pipe 13 through bore 15 whereas power line 25 is connected to an exhaust pipe 43 connected to the reservoir through an annular chamber 45 formed by the end portion of bore 15, a passage 47 and a chamber 49 of an anti-slip valve formed at the other end of bore 15. The pressure in the right hand compartment of power cylinder 1 is increased by the fluid flow which enters it through a check valve 51. The left hand compartment of the power cylinder being communicated with the reservoir, the piston 56 of the power cylinder is displaced towards the left and draws through a piston rod 55 a bell crack lever 57 which lifts up the implement.

One of the ends of a follow-up rod 59 is pivoted to the lower arm of the bell crank lever and the opposite end of said rod 59 is attached to a lever 61 for rotating it. An intermediate point of lever 61 is connected to valve member 29 and the lower end of lever 61 is adapted to rotate about a pin 63 associated with the control lever, whereby the lever 61 restores the valve member into its normal position as soon as the power piston has taken the position corresponding to that of the control lever 30.

For lowering back the implement to another predetermined position, control lever 30 is brought back towards the left by a convenient amount, as indicated on FIGURE 3. The power lines 25 and 27, are then respectively communicated with the pressure pipe 13, and with the reservoir 11. It is however to be noted that in this case the working surface of the pressure on the piston of the power cylinder is lesser than it was in case of raising movement, (one half in a preferred embodiment) resulting in a less abrupt lowering of the tool, the pressure losses in the pipes also hindering the movement. The follow-up rod operates in the same way as before to bring back the valve member 29 in its neutral position as soon as the implement has taken the position corresponding to that of the control lever 30.

It is equally to be noted that, in case the engine is stopped and does not drive the pumps any more, the lowering of the implement is prevented by the check valve 51 which cuts off the communication between power line 27 and the right hand compartment of the power cylinder to maintain the latter under pressure.

Once the implement has been lowered to its working position, preferably it is not maintained in its "servo" position, in which any movement of the implement with respect to the tractor frame is prevented, but on the contrary is put in a "floating" position in which the implement is free from the tractor and can adapt itself to the unevenness of the ground much more easily. This type of connection is obtained by pushing back towards the left the lever 21 from the position S (servo) into the position F (floating) which results in spool 17 passing from the position of FIGURES 1–3 to the position of FIGURE 4; this change does not necessitate manual effort as both positions are equally stable.

In its new position, the spool 17 puts the annular chamber 45 of bore 15 in communication with both compartments of the power cylinder, which are thus both connected to the outlet reservoir. No force is then opposed to the free displacement of the tool which is enabled to follow the unevenness of the ground.

The system described above has the following disadvantages: in case there occurs an incipient skid because the reaction load of the tool exceeds the adherence of the rear axle, the only means to apply on the rear axle a part of the tool weight consists in passing again from the "floating" to the "servo" position, and then in slightly pushing back the control lever 30 towards the right. Such an operation takes time and moreover does not permit any metering.

A device according to the present invention is associated to the "floating" control, which permits temporarily transfer of part of the weight of the implement onto the rear axle in a progressive, easily metered and almost instantaneous manner. This device includes an anti-slip valve including a valve member 69 reciprocable in a bore 67 prolongating bore 15. Communication 71 between bore 67 and bore 15 remains closed by the enlarged end of the valve member 69, at all times, and the portion of the bore 67 to the left of the enlarged portion as seen in the drawings is communicated with the reservoir by the passage 43.

In its normal position (as shown on FIGURES 1 to 4) valve member 69 is urged against an abutment, not shown, by a spring 73 compressed against the end face of bore 67. In its normal position the enlarged left hand end portion of valve spool member 69 separates the center section or primary chamber 70 of the bore 67 from a counterbore 75 which communicates with pressure pipe 13.

When the control lever 21 is moved towards the left beyond the "floating" position F, the spool 17 is brought into abutment against the valve spool 69. Upon continued displacement of the control lever, valve member 69 is biased towards the left against the force of coil spring 73; valve spool 69 approaches the left shoulder of counterbore 76, and restricts the fluid flow opening between chamber 49 and discharge pipe 43, thereby increasing the pressure head loss, and accordingly increasing the pressure in the system. Since counterbore 75, communicates with annular chamber 45, the same pressure is established in the chamber and in the counterbore.

Since in this position of the control handle 21, annular chamber 45 is in communication with the opposed compartments of the power cylinder, the difference of the effective surfaces on the opposite faces of the piston causes a force which tends to lift up the implement. When only a partial closing off of passage 42 is produced by valve member 69, the only result is a transfer of part of the weight of the implement onto the rear axle, without the tool being ungrounded. A passage 77, provided inside the valve member 69, communicates reaction chamber 72 with primary chamber 70 in which there exists the same pressure as in the power cylinder. The other parts of the hydraulic system, including spool 17 and valve member 69, are hydraulically balanced so that the reaction received by the driver through the intermediary of the control lever 21 is proportional to the pressure in reaction chamber 72, that is to say to the raising effort exerted by the power cylinder. The pressure of coil spring 73 is weak and negligible in comparison to the reaction pressure force.

As soon as the slip has stopped and a normal adherence has been resumed, the driver only has to release the control lever 21 so that the latter comes back to the "floating" position, and spool 17 again becomes independent from the anti-slip valve.

A compression spring can be interposed between spool 17 and valve member 69 for lengthening the control stroke of the anti-slip valve. But that is a refinement which does not change the basic operation of the device.

Among the advantages of the device described above it should be noted that control lever 21 (which actuates the anti-slip valve at the end of its stroke) is independent from control lever 30, so that the position of the latter is never changed during working; but if in course of working (implement in "floating" operation) the driver will check the implement position (depth of ploughing for instance) he only has to momentarily push back the lever 21 in "servo" position S and the power cylinder automatically brings back the implement in the position corresponding to that of lever 30.

It is also to be noted that the unit described in connection with the anti-slip device constitutes a preferred but in no way limiting embodiment of the invention. Particularly the follow-up control valve can be of the open-center type in which, in neutral position, there remains a permanent flow through the pump, the follow-up control valve, and the reservoir. The interest of using a closed-center valve resides in the possibility of mounting in series as many follow-up control valves intended to control as many auxiliary cylinders as desired, without it being necessary to isolate the return flows. A pressure outlet 79 can be provided (FIGURE 1) in order to feed as many closed-center systems as desired.

While the invention has been described in detail, I do not wish to be limited to the particular constructions and/or arrangements shown in the drawings; but it is my intention to cover all adaptations and modifications thereof which come within the practice of those skilled in the art.

What I claim is:

1. In a hydraulic lift system having pump means powered from a tractor engine having intake and outlet pressure pipes, said system being adapted for connecting mounted implements to a tractor consisting of a fixed hydraulic cylinder, a differential piston in said cylinder, a piston rod connected to said piston, a bell crank lever driven by said piston, a return reservoir, primary valve means, a valve spool in said valve means, said valve spool when in a first position communicating said pump outlet pressure pipe with a central chamber of secondary valve means, said secondary valve means having a port in permanent communication with the piston face having the lesser effective area and a port in communication with the piston face having the greater effective area through a check valve, said secondary valve means being adapted to control the pressure in said ports, a manually actuated secondary control lever for operating said secondary valve means, a follow-up linkage connected to said bell crank lever and to said control lever for bringing back said secondary valve means into normal position, two central ports connecting with both faces of said piston, said valve spool when in a second position communicating said central ports and both faces of the piston to said reservoir through a discharge line, said valve spool when shifted beyond its second position actuating valve means which restricts communication between said discharge line and said reservoir, pressure reaction means adapted to oppose movement of said last mentioned valve means and valve spool beyond said second position, and a manually actuated primary control lever independent of said secondary control lever for controlling said valve spool.

2. In a hydraulic lift system having pump means with intake and outlet pressure pipes, said lift system being adapted for a tractor and comprising in combination; a fluid pressure lift cylinder having a piston separating two opposed chambers in the cylinder, a piston rod connected to said piston, a raising arm driven by said piston rod for raising and lowering a mounted implement, a return reservoir, primary valve means having a valve bore and a valve spool reciprocating therein, said valve spool, when in a first position, communicating said pressure pipe with secondary valve means, said secondary valve means being adapted to connect either cylinder chamber to the pressure pipe and the other cylinder chamber to the discharge reservoir upon movement of a valve member by a control lever, said valve spool when in a second position communicating both cylinder chambers to the return reservoir, said valve spool when urged beyond its second position actuating an anti-slip valve means for increasing the pressure in said cylinder chambers, said cylinder piston having different pressure areas on its opposed faces so that a raising force is exerted on the implement upon operation of the anti-slip valve.

3. A hydraulic lift system comprising a power cylinder, a power piston separating two opposed chambers in said power cylinder, a control valve adapted to connect either chamber to a fluid pressure line and to connect the opposed chamber to a discharge line, manually operated separate valve means adapted to connect both cylinder chambers to said discharge line and optionally to actuate other valve means for increasing the pressures in said discharge line, whereby the pressure in said discharge line and in both cylinder chambers is increased above the reservoir pressure, said power piston having different pressure areas in said opposed chambers whereby both sides of said piston receive a pressure force substantially lesser than that developed by the operation of the control valve.

4. A tractor hydraulic lift system comprising a double acting power cylinder, a differential power piston in said cylinder, an implement operatively connected to said piston and adapted to be raised or lowered upon reciprocation of said piston, a control valve for controlling operation of said piston, manually operated means for operating said control valve, follow-up means for bringing back said control valve to its normal position upon movement of said implement corresponding to that of said manually operated means, valve means controlled by manually operated means independent from the first-named manually operated means, said valve means in a first position communicating said control valve with a pressure pipe, said valve means when in a second position communicating said control valve with a discharge line only, said valve means when shifted beyond said second position against a reaction force increasing the pressure in the discharge line above the pressure in a return reservoir, said reaction force being substantially in a direct relation with said pressure increase for transmitting a reaction feel to the driver.

5. In a hydraulic lift system comprising a double-acting power cylinder, a piston reciprocable in said cylinder having different pressure areas on each face, a pressure line, a discharge line, a control valve for communicating alternately said pressure line to one of said pressure areas while communicating said discharge line to the other of said areas, manually actuated valve means independent of said control valve for deactuating said control valve effect on said piston by communicating both faces of said piston with said discharge line, an anti-slip valve including a manually controlled valve member, said valve member when in normal position maintaining unrestricted communication between said discharge line and a return reservoir, said valve member when shifted toward an operative position against the force of a spring being adapted to restrict said communication and communicate said discharge line to pressure higher than that in said return reservoir for increasing the discharge line pressure, said valve member being submitted on its rear face to the pressure in said discharge line whereby a pressure reaction is transmitted to the manual control of said valve member.

6. In a hydraulic lift system according to claim 5 wherein said valve member is shifted toward said operative position by said valve means when said valve means communicates both faces of said piston.

7. In a farm tractor and the like having a lift cylinder containing a movable wall that is so arranged that its opposite sides are subjected to different areas of fluid pressure, first conduit means communicating with the side of said piston having the larger area, and second conduit means communicating with the side of said piston having the smaller area, and a control valve having a pressure inlet port and means for selectively communicating pressure from said inlet port to said first and second conduit means: a valve body having a pressure supply port, a working port that communicates with said pressure inlet port, and first and second pressure balancing ports which respectively communicate with respective first and second conduit means; control means which when in one condition communicates said pressure supply and pressure inlet ports while preventing communication between said pressure balancing ports, and when in a second condition closes off said pressure supply port while communicating said bypass pressure balancing ports; and means for modulating pressure to said pressure balancing ports when said control means is in said second condition.

8. In a farm tractor and the like a hydraulic lift system comprising: a cylinder containing a movable wall that is so arranged that its opposite sides are subjected to different areas of fluid pressure; first conduit means communicating with the side of said piston having the larger area, and second conduit means communicating with the side of said piston having the smaller area; a control valve having a pressure inlet port and first and second working ports which communicate with respective first and second conduit means; said control valve having control means for alternately communicating said inlet port to said first and second working ports; said control means being capable of also simultaneously closing off said working ports from said inlet port; a control pressure regulator for providing a modulated pressure discharge; and means communicating said pressure discharge simultaneously to both first and second conduit means.

9. The structure as recited in claim 8 wherein said last named means comprises a valve adapted to be brought into a position in which both faces of said piston are communicated, a chamber forming the common communication between the faces of said piston, and conduit means communicating said chamber with a return reservoir; and said control pressure regulator comprises valve means for forming a restriction in said last named conduit means, and valve means for communicating fluid pressure which is higher than that of said reservoir to said common chamber via said last named conduit means.

10. In a farm tractor and the like having a power cylinder and a movable wall therein having opposite sides of unequal pressure areas subject to fluid pressure to move the wall in one or the other direction, first and second conduit means communicating with the opposite sides of said wall, a fluid pressure source, control means for communicating said fluid pressure source with one or the other of said first and second conduit means to effect movement of the wall in one or the other direction, and a second set of conduits which connect respectively the opposite sides of said wall to equalize the pressure in said power cylinder on either side of said wall, means for controlling communication of fluid pressure from said fluid source to said first mentioned control means when disposed in a first position and providing intercommunication of said second set of conduits which equalize the pressure on either side of said power piston in a second position, and means for increasing the equalized pressure in said power sylinder to provide an unbalanced force on said wall moving it in one direction.

References Cited in the file of this patent
UNITED STATES PATENTS

| | | |
|---|---|---|
| 2,078,749 | Wood | Apr. 27, 1937 |
| 2,127,877 | Maglott | Aug. 23, 1938 |
| 2,303,752 | Meredith | Dec. 1, 1942 |
| 2,750,862 | Garmager | June 19, 1956 |
| 2,770,222 | Anderson | Nov. 13, 1956 |
| 2,830,561 | Lindstrom | Apr. 15, 1958 |
| 2,886,948 | Pomper | May 19, 1959 |

FOREIGN PATENTS

| | | |
|---|---|---|
| 1,047,510 | Germany | Dec. 24, 1958 |

UNITED STATES PATENT OFFICE
CERTIFICATE OF CORRECTION

Patent No. 3,053,234                September 11, 1962

Gerard Chevreux

It is hereby certified that error appears in the above numbered patent requiring correction and that the said Letters Patent should read as corrected below.

Column 3, line 8, for "crack" read -- crank --; column 6, line 67, strike out "bypass"; column 8, line 12, for "sylinder" read -- cylinder --.

Signed and sealed this 26th day of March 1963.

(SEAL)
Attest:

ESTON G. JOHNSON                DAVID L. LADD
Attesting Officer                Commissioner of Patents